United States Patent
Siedle

(10) Patent No.: US 11,220,433 B2
(45) Date of Patent: Jan. 11, 2022

(54) PROCESS FOR MODIFICATION OF CARBON SURFACES

(71) Applicant: Indiana University Research and Technology Corporation, Indianapolis, IN (US)

(72) Inventor: Allen R. Siedle, Bloomington, IN (US)

(73) Assignee: Indiana University Research and Technology Corporation, Indianapolis, IN (US)

( * ) Notice: Subject to any disclaimer, the term of this patent is extended or adjusted under 35 U.S.C. 154(b) by 11 days.

(21) Appl. No.: 15/739,663

(22) PCT Filed: Jun. 9, 2016

(86) PCT No.: PCT/US2016/036663
§ 371 (c)(1),
(2) Date: Dec. 22, 2017

(87) PCT Pub. No.: WO2016/209630
PCT Pub. Date: Dec. 29, 2016

(65) Prior Publication Data
US 2018/0312406 A1 Nov. 1, 2018

Related U.S. Application Data

(60) Provisional application No. 62/183,266, filed on Jun. 23, 2015.

(51) Int. Cl.
*C01B 32/21* (2017.01)
*C08K 9/02* (2006.01)
*C08K 9/04* (2006.01)
*H01M 4/583* (2010.01)

(52) U.S. Cl.
CPC .............. *C01B 32/21* (2017.08); *C08K 9/02* (2013.01); *C08K 9/04* (2013.01); *H01M 4/583* (2013.01)

(58) Field of Classification Search
CPC ......... C01B 32/21; C01B 32/354; B08K 9/02; B08K 9/04
See application file for complete search history.

(56) References Cited

U.S. PATENT DOCUMENTS

| | | | | |
|---|---|---|---|---|
| 4,500,678 A | * | 2/1985 | Kita | C10M 103/02 508/112 |
| 5,622,683 A | * | 4/1997 | Hung | C22C 49/14 252/502 |
| 5,713,988 A | | 2/1998 | Belmont et al. | |
| 5,851,417 A | * | 12/1998 | Hung | B01J 21/18 252/62.55 |
| 5,965,055 A | * | 10/1999 | Hung | B01J 21/18 252/62.51 R |
| 6,645,455 B2 | * | 11/2003 | Margrave | B01J 23/74 423/447.1 |
| 6,827,918 B2 | | 12/2004 | Margrave et al. | |
| 6,841,139 B2 | | 1/2005 | Margrave et al. | |
| 7,029,646 B2 | * | 4/2006 | Margrave | B82Y 30/00 423/447.1 |
| 7,225,561 B2 | | 6/2007 | Louw | |
| 7,452,519 B2 | | 11/2008 | Khabashesku et al. | |
| 7,563,542 B2 | | 7/2009 | Yazami et al. | |
| 7,632,481 B2 | | 12/2009 | Khabashescu et al. | |
| 8,287,699 B2 | | 10/2012 | Zhamu et al. | |
| 8,398,950 B2 | | 3/2013 | Khabashesku | |
| 8,420,717 B2 | | 4/2013 | Khabashesku et al. | |
| 2009/0090640 A1 | * | 4/2009 | Jang | B82Y 30/00 205/555 |
| 2013/0056401 A1 | * | 3/2013 | Linford | C01B 31/00 210/198.2 |
| 2014/0255705 A1 | * | 9/2014 | Nepal | C30B 25/186 428/446 |

FOREIGN PATENT DOCUMENTS

CN 103276593 A * 9/2013

OTHER PUBLICATIONS

Whitener Jr, Keith E., et al. "Graphene as electrophile: reactions of graphene fluoride." The Journal of Physical Chemistry C 119.19 (2015): 10507-10512.*
Cudziło, Stanislaw, et al. "Combustion reactions of poly (carbon monofluoride),(CF) n, with different reductants and characterization of the products." Propellants, Explosives, Pyrotechnics: An International Journal Dealing with Scientific and Technological Aspects of Energetic Materials 32.2 (2007): 149-154.*
Hou, Kaiming, et al. "Structural and tribological characterization of fluorinated graphene with various fluorine contents prepared by liquid-phase exfoliation." RSC Advances 4.100 (2014): 56543-56551.*
Urbanová, Veronika, et al. "Thiofluorographene-hydrophilic graphene derivative with semiconducting and genosensing properties." Advanced Materials 27.14 (2015): 2305-2310.*
Dubecký, Matúš, et al. "Reactivity of fluorographene: a facile way toward graphene derivatives." The journal of physical chemistry letters 6.8 (2015): 1430-1434.*
Gong, Peiwei, et al. "Tunable photoluminescence and spectrum split from fluorinated to hydroxylated graphene." Nanoscale 6.6 (2014): 3316-3324.*
Hung, Ching-Cheh. "Carbon Fibers Produced from Graphite Fluoride by Thermal Decomposition in an Inert Environment." MRS Online Proceedings Library Archive 349 (1994).*

(Continued)

*Primary Examiner* — Richard M Rump
(74) *Attorney, Agent, or Firm* — Faegre Drinker Biddle & Reath LLP

(57) ABSTRACT

Processes and methods for modifying the surface of graphitic carbon with covalently bonded chemcial groups and the treated graphitic carbon products of such processes are provided. Additionally, exemplary articles comprising such treated graphitic carbons are provided.

14 Claims, No Drawings

(56) References Cited

OTHER PUBLICATIONS

Hou, Kaiming, et al. "Construction of highly ordered fluorinated graphene composite coatings with various fluorine contents for enhanced lubrication performance." Tribology Letters 60.1 (2015): 6.*

Hung, Ching-Chen, and Aniko Prisko. "Intercalation of Lithium in Pitch-Based Graphitized Carbon Fibers Chemically Modified by Fluorine: Soft Carbon With or Without an Oxide Surface." (1999).*

Milanova, Valentina, et al. "Synthesis and Study of Carbon-Based Nanocomposites With Co—Sn Nanoparticles for Electrode Materials." Journal of Chemical Technology & Metallurgy 50.3 (2015).*

Asanov, I. P., et al. "X-ray photoelectron study of fluorinated graphite intercalation compounds." Journal of structural chemistry 39.6 (1998): 928-932.*

Paasonen, V. M., V. M. Grankin, and A. S. Nazarov. "Thermal decomposition of fluorinated graphite intercalated by germanium tetrachloride." Inorganic materials 35.2 (1999): 126-129.*

International Search Report and Written Opinion issued by the ISA/US, Commissioner for Patents, dated Nov. 3, 2016, for International Application No. PCT/US2016/036663; 7 pages.

Tang, Qing, et al., "Graphene-related nanomaterials: tuning properties by functionalization," Nanoscale, RSC Publishing, vol. 5, No. 11, Jun. 7, 2013, pp. 4541-4583, retrieved from the Internet on Dec. 14, 2017 at https://www.researchgate.net/publication/23574098/Graphene-related_nanomaterials_Turning_properties_by_functionalization.

Lockett, M.R. and Smith, L.M., "Attaching molecules to chlorinated and brominated amorphous carbon substrates via Grignard reactions", Langmuir, (2009) 25, pp. 3340-3343.

Zhang, N. et al., "Bottle-Brush Brushes: Cylindrical Molecular Brushes of Poly(2-oxazoline) on Glassy Carbon, Macromolecules", (2009) 42, pp. 5345o-5351.

Kolb, H.C. et al., "Click Chemistry: Diverse Chmical Function from a few Good Reactions", Chem. Int. Ed., (2001) 40, pp. 2004-2021.

Harris, P.J.F., "New Perspectives on the Structure of Graphitic Carbons", Crit. Rev. Solid State Mater. Sci., (2005) 30, pp. 235-253.

Bismarck, A. et al., "Polystyrene-grafted Carbon Fibers: Surface Properties and Adhesion to Polystyrene", Journal of Thermoplastic Composite Materials, (2005) 18, pp. 307-331.

International Search Report and Written Opinion received for PCT Patent Application No. PCT/US2016/036663, dated Nov. 3, 2016, 10 pages.

Tang et al., Graphene-realted nanomaterials: tuning properties by functionalization. Nanoscale, Jun. 7, 2013. pp. 4541-4583, Related.

* cited by examiner

PROCESS FOR MODIFICATION OF CARBON SURFACES

CROSS REFERENCE TO RELATED APPLICATIONS

This application is a U.S. National Stage Application of International Patent Application No. PCT/2016/036663, filed Jun. 6, 2016, which claims the benefit of U.S. Provisional Patent Application No. 62/183,266, filed on Jun. 23, 2015, the disclosures of which are expressly incorporated by reference herein in their entireties.

FIELD OF THE DISCLOSURE

The present disclosure is related generally to surface modification of graphitic carbon and more particularly to processes for the modification of graphitic carbon through the introduction of covalently bonded functional chemical groups. The present disclosure is also related to treated graphitic carbon compositions and articles comprising treated graphitic carbon.

BACKGROUND

Carbon occurs in allotropic forms distinguishable by the hybridization of its atomic orbitals. Diamond and diamond-like films typically contain $sp^3$ hybridized carbon arranged in a three-dimensional network and are hard, electrically insulating, colorless and transparent. Alternatively, it is possible to construct networks of $sp^2$ hybridized carbon. The carbon atoms lie in hexagonal networks. Nanomaterials and nanostructures are materials that are very small with sizes in the range of single molecules or even single atoms in one or two dimensions. Some effort has been devoted to the chemical functionalization of carbon nanostructures.

Carbon nanotubes comprise long, hollow tubes formed from single sheets of $sp^2$ hybridized carbon atoms arranged in hexagonal arrays. The sheets are rolled up so as to form seamless cylinders. Multiwall nanotubes are made up of multiple, concentrically arranged nanotubes. Multiwall nanotube sizes can range from about 0.7 nm up to tens of nanometers in diameter; and tens or even hundreds of microns in length. The length to diameter ratio is so large that the tubes are considered to be one-dimensional materials.

Graphene is a two-dimensional material comprising a single, planar sheet of $sp^2$ hybridized carbon atoms arranged in a hexagonal, honeycomb lattice. Graphitic carbon is a three-dimensional material made up of multiple layers of $sp^2$ hybridized carbon atoms. Typical properties of graphitic carbon include electrical conductivity, black color, opaque hue, and a hardness that is less than diamond. The carbon atoms lie in sheet-like hexagonal networks called basal planes. In disordered graphite, these sheets can be bent, curved and folded, but the curvature is insufficient to generate closed, tubular morphologies. As long range order develops, they assume an increasingly parallel arrangement. Further ordering leads to a flattening of the sheets and they form into layers. In turbostratic graphite, interlayer spacing is constant but the layers are displaced sideways and rotationally with respect to one another. Upon still further ordering, these sheets become oriented so that the regular structure of crystalline graphite results. Structurally ordered regions of graphite comprise domains. The domains are often not ordered relative to one another and form a patchwork quilt. Their size can be as small as tens of nanometers and, in single crystals, many centimeters.

Graphene is defined by the International Union for Pure and Applied Chemistry (IUPAC) as a single carbon layer of graphite structure, describing its nature by analogy to a polycyclic hydrocarbon of quasi-infinite size. However, in contemporary literature, the word graphene is used to label a wide variety of carbon materials. As described herein, graphene will refer to a single carbon layer of graphite structure, and multi-layered graphite structure may be referred to as graphene layers.

Reactivity of graphitic carbon is highly anisotropic. In other words, carbon atoms located at the edges are more reactive than those situated in the interior of the sheets. This difference in reactivity is responsible for the chemical durability exhibited by graphitic carbon because carbon atoms in the basal planes vastly outnumber those located at sheet edges. It would be desirable if means to carry out chemistry on exposed basal graphitic planes were available because the number density of functional groups could be greatly increased.

Fluorine can be introduced at high concentrations on the basal graphitic planes. This can be done by treatment with elemental fluorine or a suitable fluorinating agent such as xenon difluoride. In the limiting case, reaction of powdered graphite with fluorine yields graphite fluoride that contains about one fluorine atom per carbon atom. Because reactions with elemental fluorine are often quite vigorous, they can be moderated by mixing the fluorine with a suitable inert diluent such as helium or nitrogen. Fluorination can also be achieved by reaction in a microwave discharge with a fluorine-containing gas such as sulfur hexafluoride. Fluorine, along with oxygen, can be concurrently added to carbon by use of a mixture containing fluorine and oxygen in a process known as oxyfluorination.

Chemistry of graphite fluoride and fluorinated graphitic carbon is limited in the prior art. Bourlinos et al. obtained black, water soluble, graphitized carbon particles by heating graphite fluoride in a potassium hydroxide-sodium hydroxide eutectic. Worsley et al. prepared soluble graphene layers by treating graphite fluoride with butyl- or hexyllithium. Chakraborty et al. removed fluorine from graphite fluoride with lithium in ammonia to give an intermediate that, in a second step, reacted with 1-iodododecane to yield dodecylated graphite platelets.

Some works have dealt with attachment of polymer chains to graphitic carbon such as carbon fibers and carbon black. When polymers are grafted from graphitic carbon, chain growth begins on the surface. Functional groups are needed to anchor chain initiators to the surface; one per chain is required. In many cases, such groups are absent or present in insufficient number so they must first be added. This is commonly done by oxidizing the graphitic surface with nitric acid that introduces carboxylic acid groups.

Graphitic carbon has numerous applications in industry. These include use as a catalyst or as a support for catalysts; as charge storage media in batteries and supercapacitors; as adsorbents for the recovery of volatile organic solvents and purification of air or water; as fillers or reinforcing elements in composites, as pigments in inks; as electrode materials; and as lubricants. Performance in these applications depends strongly on the properties of the carbon surface and is accordingly influenced by the presence or absence of surface chemical functional groups. Carbon has outstanding thermal and chemical resistance, a feature that makes difficult addition of new functional groups designed to improve or enhance performance. It would be desirable to attach functional groups to carbon surfaces and increase the surface coverage of functional groups beyond that currently available.

SUMMARY

Briefly, the present disclosure provides processes for the treatment of graphitic carbon that enable introduction of chemical groups onto graphitic carbon. Additionally, the present disclosure provides graphitic carbon compositions produced by the disclosed processes. In some exemplary embodiments, fluoride is incorporated onto graphitic carbon, followed by the replacement of fluorine with other functional groups.

One exemplary embodiment relates to articles comprising such tested graphitic carbon. In some embodiments, graphite fluoride is used in a process wherein fluorine atoms are replaced by another halogen, in some embodiments chlorine. In other embodiments, graphite fluoride is used in a process wherein fluorine atoms are replaced by hydrogen atoms, optionally using UV light. In some other embodiments, the processes of the present disclosure used to create substituted graphitic carbon compositions are carried out without the use of, or in the absence of, solvents. Gas chemistry can advantageously reduce the use of solvents needed in the processes of the present disclosure.

Another exemplary embodiment of the present disclosure relates to modification of graphitic carbon so as to provide graphitic carbon that is hydrophobic or hydrophilic and that is wettable by or dispersible in liquids.

In some embodiments of the present disclosure, treatment processes produce treated graphitic carbon that can engage in advantageous chemical and physical interactions with nongraphitic substances.

In other embodiments of the present disclosure, the produced treated graphitic carbon and articles containing such treated graphitic carbon are thermally or electrically conductive.

Another exemplary embodiment of the present disclosure relates to composite articles comprising treated graphitic carbon and nongraphic substances.

Another exemplary embodiment of the present disclosure relates to composite articles reinforced by treated graphitic carbon.

Another exemplary embodiment of the present disclosure, relates to filter media comprising graphitic carbon.

Another exemplary embodiment of the present disclosure, relates to lubricants comprising graphitic carbon.

DETAILED DESCRIPTION OF EMBODIMENTS

This disclosure relates to the modification of graphitic carbon. Graphitic carbon, as used herein, refers to an object comprising at least two parallel carbon sheets. In one exemplary embodiment, graphitic carbon has a thickness of approximately 0.7 nm. In a more particular embodiment, graphitic carbon comprises five or more parallel carbon sheets. Graphitic carbon forms include, but are not limited to, films, foils, flakes, granules, sheets, mats, membranes, ribbons, powders, dispersions, foams, aerogels, exfoliated graphitic carbon, colloidal graphite, pyrolytic graphite, flexible graphite, expanded graphite, turbostratic graphite, glassy carbon, carbon onions, carbide-derived carbon, porous, microporous or mesoporous graphitic materials, fibers, filaments, aggregates of fibers or filaments, textiles, particles, aggregates of particles, hollow structures such as bubbles, graphitic nanoplatelets and monolithic articles such as crucibles or electrodes. In some exemplary embodiments, graphitic carbon is in the form of a coating on solid articles comprised of diamond or boron nitride; or as pieces combined with other materials such as, for example, glass, plastics, metals, ceramics, elastomers or textiles. Graphitic carbon, as used herein, can also refer to a plurality of such objects.

In one exemplary embodiment, a process for the modification of graphitic carbon comprises the steps of: adding fluorine atoms to at least part of the graphitic carbon to form a fluorinated graphitic carbon, and reacting the fluorinated graphitic carbon with one or more reagents to replace one or more of the fluorine atoms with one or more different functional groups. In some embodiments, the process further comprises removing at least part of the fluorine atoms attached to the graphitic carbon that were not replaced by the functional groups.

In one exemplary embodiment, fluorine addition is accomplished by treating graphitic carbon with a suitable fluorinating agent. Exemplary fluorinating agents include elemental fluorine, terbium tetrafluoride, xenon difluoride, and halogen fluorides such as chlorine trifluoride. In some embodiments, a catalyst such as hydrogen fluoride is used. In another exemplary embodiment, fluorine addition is accomplished using a plasma derived from a suitable fluorine-containing compound such as sulfur hexafluoride. In yet another exemplary embodiment, fluorine is introduced along with oxygen by oxyfluorination. In still another exemplary embodiment, imagewise addition of fluorine is achieved by laser irradiation of fluoropolymer films applied to the surfaces of graphitic carbon as is known in the art.

Once the fluorinated graphitic carbon has been formed, carbon-fluorine bonds can be replaced with bonds between carbon and an element E where E is selected from H, C, N, O, Cl, Br, I, P, As, S, Se, Te, Si, Ge and Sn. In some cases, replacement of the fluorine is an atom-for-atom replacement such as, for example, when a hydrogen or chlorine atom replaces a fluorine atom. In other cases, E can be part of a complex molecule in which are located other chemical groups.

In some exemplary embodiments, the element E is the functional group. In other exemplary embodiments, the element E resides at the ligating terminus or bonding end of a moiety that becomes attached to the carbon of the graphitic sheet. In some embodiments, the moiety is the functional group. In other embodiments, the moiety is part of the functional group. In still other embodiments, one or more functional chemical groups are located elsewhere in or attached to these moieties. In some exemplary embodiments, the functional groups impart to pristine graphitic carbon new, useful chemical and physical properties such as chemical reactivity or compatibility with nongraphic materials, lubricity, hydrophobicity or dispersibility in liquids. Exemplary functional chemical groups comprise substituted or unsubstituted hydrocarbyl groups such as alkenyl, alkynyl, aryl, alkylaryl, alkenylaryl, alkynylaryl; —H, —F, —Cl, —Br, —I, —OH, —OR, —S— wherein the sulfur is connected to a first atom (e.g. a first carbon atom) by a first single bond and a second atom (e.g. a second carbon atom) by a second single bond, —SO— wherein the sulfur is connected to a first atom (e.g. a first carbon atom) by a first single bond and a second atom (e.g. a second carbon atom) by a second single bond, —SO$_2$— wherein the sulfur is connected to a first atom (e.g. a first carbon atom) by a first single bond and a second atom (e.g. a second carbon atom) by a second single bond, —SR, —SH, —SO$_3$H, —RSO$_3$, —B(OH)$_2$, =N— wherein the nitrogen is connected to one atom (e.g. a first carbon atom) by a double bond and a second atom (e.g. a second carbon atom) by a single bond, =NH, —NH$_2$, —NHR, —NRR', —PHR, —PO$_3$H$_2$, —PO$_3$RR', —PS$_3$H$_2$, —PS$_3$RR', —N$_3$, —NO$_2$, —CN, —NCO, —C$_2$H, —C$_3$H$_5$, —SCN, polyether, epoxy, keto, carboxylic acid, carboxylic acid halide, carboxylic acid salt, ester, disulfide, pyridyl, imidazolyl, thienyl, ferrocenyl or alkoxysilyl groups. R is a hydrocarbyl group such as alkyl, alkenyl, alkynyl, aryl or alkylaryl group that can be unsubstituted or substituted with groups selected from nitrogen, oxygen, sulfur, selenium, halogens, phosphorous, silicon, boron, tin, iron, cobalt or nickel. R' is similarly comprised and same or different from R. In one exemplary embodiment, an oxygen-containing R or R' group comprises one or more functional groups such as alcohol, ester, aldehyde, keto, carboxylic acid or epoxy groups. An illustrative example of an oxygen-containing group bonded to carbon in graphitic carbon through a sulfur atom (E) is —S(CH$_2$)$_3$OH. An illustrative example of a silicon-containing group bonded through nitrogen atom (E) to carbon in graphitic carbon is —NH(CH$_2$)$_3$Si(OC$_2$h$_5$)$_3$. A nitrogen-containing alkyl group can comprise one or more of amino, cyano, isocyanato or azido groups. Illustrative examples of alkenyl and alkynyl hydrocarbyl groups are allyl and propargyl.

The exemplary functional groups recited above are all electrically neutral, that is, they bear no net electrical charge. In other exemplary embodiments, an electrical charge is introduced. In one exemplary embodiment, one or more groups containing ionizable hydrogen atoms, such as —SO$_3$H, —PO$_3$H$_2$, —PS$_2$H and —CO$_2$H, are converted by treatment with a suitable base to the ionized forms, —SO$_3^-$, —PO$_3$H$^-$, —PS$_2^-$ and —CO$_2^-$. Suitable bases include alkali metal hydroxides such as sodium hydroxide; and quaternary ammonium hydroxides such as tetramethylammonium hydroxide. In another exemplary embodiment, one or more functional groups bearing basic groups such as amino or substituted amino groups are converted to positively charged quaternary ammonium salts by reaction with an alkylating agent such as an alkyl halide, alkyl sulfate or alkyl trifluoromethanesulfonate. An illustrative but not limiting example is a NH(CH$_2$)$_8$NH$_2$ moiety that, upon treatment with methyl iodide, is converted to —NH(CH$_2$)$_8$NH$_2$CH$_3^+$I$^-$.

In some exemplary embodiments, following the fluorine-replacement step, unreacted fluorine remaining on graphitic carbon can be removed in another step. Illustrative ways of removing the unreacted fluorine include electron beans radiation, hydrogen plasma, and/or chemical reducing agents such as sodium iodide or hydrazine. Because fluorination reduces the electrical conductivity of graphitic materials such as graphite, removal of unreacted fluorine can increase electrical conductivity. This may be advantageous, such as in embodiments in which the graphitic carbon is to be used as an electrode, in an energy storage device such as a battery or a capacitor, or as part of an electronic device or in other such applications where electrical conductivity is desirable. In some embodiments, however, it not necessary that all of the remaining fluorine atoms be removed. In some embodiments, between about 0.1% and about 100%, or between about 10% and about 100% of the fluorine remaining is removed.

Under certain experimental conditions, loss of fluorine without replacement by other groups can occur alongside fluorine replacement without compromising the utility of the product. For example, treatment of graphitic fluoride with ammonia 300° C. gave a product containing 47.8 atomic % F and 2.1 atomic % N, but when the reaction temperature was increased to 400° C., the product contained only 0.9 atomic % F and 13.6 atomic % N. These compounds can be used as cathode materials useful for electrochemical reduction of, for example, oxygen.

Different suitable reagents for replacement of fluorine bonded to graphitic carbon can be selected depending on the nature of E. For example, in one exemplary embodiment, fluorine is replaced by hydrogen by use of reagents that contain one or more hydrogen atoms bonded to boron, aluminum, silicon, germanium, tin or phosphorus such as diisobutylaluminum hydride, catechol borane, triethylsilane, or diphenylsilane. In another embodiment, a plasma comprising hydrogen is used in the replacement step.

In one exemplary embodiment, fluorine is replaced by other halogens or by perfluoroalkyl groups through exchange reactions with reagents that contain one or more halogen atoms or perfluoroalkyl groups bonded to boron, aluminum, gallium, indium, silicon, germanium, tin, copper, phosphorus, ytterbium or arsenic. Exemplary reagents include boron trichloride, phosphorus trichloride, phosphorus oxychloride, gallium trichloride, boron tribromide, phosphorus tribromide, diethylaluminum chloride, hexachlorodisilane, trimethylsilylchloride or trimethylsilyltrifluoromethane.

In one exemplary embodiment, fluorine atoms are replaced by hydroxy, alkoxide, mercapto, mercaptide, amino or phosphide groups, —OH, —CO$_2$H, —CN, —OR, —S— wherein the sulfur is connected to a first atom (e.g. a first carbon atom) by a first single bond and a second atom (e.g. a second carbon atom) by a second single bond, —SO— wherein the sulfur is connected to a first atom (e.g. a first carbon atom) by a first single bond and a second atom (e.g. a second carbon atom) by a second single bond, —SO$_2$— wherein the sulfur is connected to a first atom (e.g. a first carbon atom) by a first single bond and a second atom (e.g. a second carbon atom) by a second single bond, —SH, —SR, =N— wherein the nitrogen is connected to one atom (e.g. a first carbon atom) by a double bond and a second atom (e.g. a second carbon atom) by a single bond, =NH, —NH$_2$, —NHR, —NR$_2$, —PR$_2$, (R as is previously defined herein) by use of suitable alkoxide- or mercaptide-containing reagents such as alkali metal or quaternary ammonium salts of water, alcohols, hydrogen sulfide, hydrogen cyanide, thiocyanic acid, mercaptans, phosphine, amines or phosphines where R is as described above. An illustrative example of an alkali metal salt of water is potassium hydroxide. Crown ethers are useful in promoting reactions of alkali metal salts as in known in the art.

In one exemplary embodiment, fluorine atoms on graphitic carbon are replaced with hydrocarbyl groups such as alkyl, aryl, substituted alkyl or substituted aryl, alkenyl or alkynyl groups by metathetic exchange with a suitable organometallic reagent that contains a metal-carbon bond. Thus, C—F and, metal-C bonds can be exchanged. As used herein, hydrocarbyl means a univalent group formed by removing a hydrogen atom from a hydrocarbon containing rip to 25 carbon atoms. Suitable organometallic reagents comprise the group to be transferred to graphitic carbon; and a metal-carbon bond. Illustrative examples of suitable metals include sodium, potassium, magnesium, calcium, samarium, copper, manganese, tin and indium. Aluminum, indium, zinc, copper, samarium and tin are suitable due to their reduced tendency to cause loss of fluorine without replacement, thus regenerating the starting graphitic structure. Organometallic reagents comprising these elements are tolerant of functional groups so that the hydrocarbyl groups can optionally be substituted with groups containing oxygen, sulfur, nitrogen, silicon, germanium, tin, phosphorus or halogens. An example of a halogen-substituted hydrocarbyl group bonded to the graphitic carbon surface through carbon is —$C_2H_4C_8F_{17}$. An example of a zinc-containing reagent bearing an oxygen-substituted hydrocarbyl group is $BrZnCH_2CO_2C_2H_5$.

In other exemplary embodiments, fluorine atoms are replaced using suitable mercapto, azido-, cyanato-, isocyanato-, thiocyanato- or cyano-containing reagents. Exemplary reagents comprise silicon, tin, indium, aluminum or phosphorus bonded to these groups. Examples include trimethylsilyl azide, diphenylphosphoryl azide, trimethylsilyl cyanide or trimethylsilylmercaptan. In some embodiments, these functional groups are desirable because they can participate in electrocyclic reactions known in the art as "click chemistry". "Click chemistry" cycloaddition reactions may be desirable due to the high yield and stereospecificity of these reactions. Thus, in the presence of a suitable catalyst, azido groups can react with substituted acetylenes to produce tetrazole derivatives.

In one exemplary embodiment, fluorine replacement reactions are carried out in the presence of suitable solvents or mixtures of solvents such as alkanes, ethers such as diethyl ether, tetrahydrofuran or crown ethers, halogenated hydrocarbons such as dichloromethane; aromatic hydrocarbons such as toluene; hydroxylic solvents such as water or alcohols; sulfur-containing solvents such as dimethyl sulfoxide; or nitrogen-containing solvents such as acetonitrile, N-methylpyrrolidone or hexamethylphosphoramide. The reactions can be carried out at ambient pressure or under solvothermal conditions. Solvothermal reactions are conducted in a pressure-resistant vessel so that the liquid can be heated above its normal boiling point. Reactions can also be carried out in a supercritical fluid such as supercritical water, carbon dioxide or ammonia; or in a molten salt or molten mixtures of salts. An example of a molten mixture of salts is the potassium hydroxide-sodium hydroxide eutectic combination. Molten combinations that comprise eutectics or deep eutectic mixtures are desirable because they can enable a reduction in reaction temperature. Reactions can be carried out in one or more ionic liquids such as 1-methyl-3-butyl-imidazolium tetrafluoroborate. Optionally, reactions can be carried out in the presence of a phase transfer catalyst such as tetra-n-butylammonium bromide. Further, reactions may be carried out in the presence of a surfactant. Surfactants are useful because they can enhance mass transfer between liquid or dissolved reagents and graphitic carbon. Examples of surfactants include ionic surfactants such as sodium dodecylsulfonate; bile salts such as sodium cholate; non-ionic surfactants such as polyvinylpyrrolidone and Triton X-100™; or polysaccharide surfactants such as gum Arabic. Salts of perfluoroalkyl carboxylic acids and perfluoroalkylsulfonic acids, an example of which is $C_8F_{17}SO_3K$, are also useful.

In some exemplary embodiments, energy can be supplied by heating the reaction mixture; or by application of ultrasonic or microwave energy. Reaction mixture, as used herein, refers to a combination comprising graphitic carbon and one or more reactants. The reaction mixture includes but is not limited to reactions in solution. In some embodiments, the reaction is carried out with application of mechanical energy such as, for example, in a ball mill, planetary mill, vibratory mixer; or in a high shear mixer or by grinding. Such processes are referred to as milling. More than one energy source can be used, for example simultaneous heating and sonication. Replacement reactions can be carried out in air, or an inert gaseous atmosphere such as nitrogen or argon may be used. In some embodiments, replacement of fluorine can be carried out without solvent or additional liquid when the reactant is a gas under suitable reaction conditions of temperature and pressure. This may be beneficial when the graphitic carbon has a porous, mesoporous, or microporous structure such as graphitic membranes, foams or molecular sieves.

In some embodiments, it is not necessary that fluorine replacement reactions result in the replacement of all fluorine atoms in the fluorinated graphitic carbon. Often, this will not be possible because the newly installed functional groups may occupy a larger area than fluorine itself. The extent of replacement can be expressed as the yield of the replacement. The yield in these gas-solid or liquid-solid reactions may be highly variable. The yield of the replacement can strongly depend on process conditions such as concentration of reactants, time and temperature of the reaction, as well as on mass transfer between the reacting phases. An extent of replacement between 0.1 and 99 percent, or between 1 and 95 percent of the fluorine may be achieved. In some embodiments, the extent of replacement can be ascertained by using X-ray photoelectron spectroscopy to determine the ratio of surface fluorine concentration to that of the elements occurring in the replacing groups.

Under certain conditions, e.g. if the dimensions of a solid graphitic carbon are sufficiently large, reactants capable of fluorine atom addition may be unable to penetrate deeply into the object. The fluorine is then deposited predominantly on the surface. The fluorine concentration is variable and can depend on, for example, the nature and concentration of the fluorinating agent and also on the reaction time and temperature. Concentrations of up to 100 percent can, in principle, be achieved but concentrations ranging from 0.1 to 95 percent or more are suitable in some embodiments of the present disclosure.

In one exemplary embodiment of the present disclosure, only past of the graphitic carbon is treated by the process of the present disclosure. This can be achieved in ways that operate by blocking access to the surface of the object. For example, part of the graphitic carbon can be covered by a mask, applied by methods well-known in the art and made of a suitable inert material, such as gold, that interferes with fluorination of the portion of the surface beneath the mask. Alternatively, masks constructed of suitable inert materials such as silica, gold or polymethylmethacrylate can be used to interfere with fluorine removal on the portion of the surface beneath the mask. Suitable masks may be constructed so as to cover the surface of the graphitic carbon so as to create patterns or images upon the surfaces. The masks can be subsequently removed by dissolution in suitable reagents. For example aqueous potassium cyanide can remove gold; and aqueous hydrofluoric acid can dissolve silica mask.

Graphitic carbon available commercially often contains adventitious non-carbon foreign elements such as oxygen, chlorine, iron, sodium, sulfur, potassium and vanadium. Such graphitic carbon may also contain non-metallic elements such as nitrogen and oxygen added by design. For example, some graphitic carbons can contain up to 10 atomic percent of nitrogen or even more. In some embodiments, non-carbon elements do not interfere with the process of the present disclosure and, it is not necessary to remove them.

Graphitic carbon is widely used in industry and its properties may be modified or improved when treated by some exemplary processes of the present disclosure. For example, carbon black is a material produced by the incomplete combustion of heavy petroleum products. If can be used in its untreated form or oxidized to increase the surface concentration of polar functional groups, such as carboxylic acid, that improve dispersibility in applications. These applications include use as pigments, fillers and reinforcing agents for rubber goods. Such rubber goods include, tires, hoses, seals, O-rings and belts. Carbon black, oxidized or not oxidized, when treated by some exemplary processes of the present disclosure may be used alone or in combination wife other materials such as silica in same or similar applications. It can also be added to insulating polymers to increase their electrical conductivity. Electrical conductivity can, in some embodiments, be increased to greater than $10^{-6}$ S m$^{-1}$, or to greater than $10^{-1}$ S m$^{-1}$. Such composites may be useful for electromagnetic shielding or as antistatic agents. In some embodiments, exemplary composites are useful in the fabrication of batteries or capacitors; or as electrode materials useful for electrochemical applications. Carbon black treated by the process of the present disclosure can also be consolidated, for example by compression, to form denser articles.

In some embodiment, graphitic carbon particles treated by exemplary processes of the present disclosure may be useful as dispersions in applications such as photocopier or laser printer toner, as pigments in inks or paints or as lubricants. The particles can be used in a dispersion with liquids such as water, optionally combined with binders and dispersing agents such as polyvinyl alcohol, styrene/maleic anhydride copolymers and polyethoxylated amines.

In some embodiments of the present disclosure, treated graphitic carbon may be used in combination with a thermoplastic or thermosetting binder such as polyethylene, polytetrafluoroethylene or polyvinylidenefluoride. Upon heating, the binder serves to bind the components together to form a shaped article such as a disc that can be easily handled after codling.

Graphitic carbon and their surfaces may be treated, in some embodiments, to adjustably modify their surface free energies and thus control their wettability, as reflected by water contact angles. Water contact angle as used herein refers to the static water contact angle. Theoretically, a contact angle can be present within the range of 0° to 180° but in practice, these limits are almost never reached. As the water contact angle of a surface increases above 90°, the surface becomes increasingly hydrophobic and water repellent; and more easily wet by hydrocarbons such as oil. As the water contact angle decreases below 90°, the surface becomes increasingly hydrophilic and increasingly easy to wet with water. Functional groups such as carboxylic acid, carboxylate and quaternary ammonium, when attached to graphitic carbon by the process of the present disclosure, may in some embodiments reduce the water contact angle of the surface to less than 80°. Contrariwise, a graphitic carbon to which hydrocarbyl, perfluoroalkyl or perfluoroalkyalkyl groups have been attached may, in some embodiments, have a water contact angle of at least 110°. Here, perfluoroalkyl means a group having the general formula $CF_3(CF_2)_n$ where n has a range of 0 to 20; and perfluoroalkylalkyl means a group having the general formula $CF_3(CF_2)_n(CH_2)_m$ where n has a range of 0 to 20 and m has a range of 1 to 6.

In some exemplar embodiments, graphitic carbon, such as carbon fibers and the graphitic filaments in them, are treated by a process so as to incorporate functional groups such as epoxy or trialkoxysilyl groups. The treated fibers or filaments, when combined with non-graphitic materials such as concrete, rubber, polymers, resins, elastomers, fluoroelastomers and thermosets such as polyurethanes or epoxy resins, form reinforced composite materials having desirable properties such as high strength, toughness and rigidity as well as enhanced electrical and thermal conductivity. Exemplary suitable polymers include but are not limited to polyesters, polyisoprene, polybutadiene, butadiene/acrylonitrile copolymer, butadiene-styrene copolymer, silicone rubber, ethylene-vinyl acetate copolymer, polyethylene terephthalate, vinyl esters or polyamides such as nylons. In some embodiments, the composite materials so formed also contain additional components, such as fillers. Examples of suitable fillers include but are not limited to silica and rubber.

In some exemplary embodiments, carbon fibers and filaments treated by the process of the present disclosure are woven into cloth or fabric that can be used as an electrode in electrochemical applications or as a reinforcing component in composites. In other embodiments, such fibers and filaments are fashioned into a paper or fibrous mat.

In other exemplary embodiments, the graphic carbon comprises exfoliated graphite. Reaction of graphite with, for example, nitric and sulfuric acids yields an intercalated graphite compound. Upon rapid heating, the acid trapped between the carbon layers vaporizes, forcing them apart. The increase in volume leads to a dramatic expansion perpendicular to the carbon sheets. Exfoliated graphite may be used in this form or it can be compressed to form flexible sheets that can be treated by the process the present disclosure. Alternatively, particle size can be further reduced by techniques such as shear mixing or sonication. Particles of exfoliated graphite, having been treated according to an exemplary embodiment of this disclosure, can be formed into composites by combination with oils, greases or solid polymers. In some embodiments, such composites have significantly enhanced thermal conductivity. For example, a composite containing treated exfoliated graphite and an epoxy resin such as the diglycidyl ether of bisphenol A can have an enhancement in thermal conductivity of 100%, 200%, 500% or even more. The enhancement is represented by $(k_{composite}-k_{matrix})/(k_{matrix}) \times 100\%$ where $k_{composite}$ is the thermal conductivity of the composite and $k_{matrix}$ is the thermal conductivity of the material without any addition of treated exfoliated graphite. In some embodiments, such composites are useful in promoting heat dissipation in devices containing a high density of electronic circuits.

Graphite typically has a specific surface area of about 2 $m^2$ gm$^{-1}$. As the surface area of graphitic carbon rises above that, porosity that imparts useful adsorbent properties develops. Porosity can be characterized by pore diameters. Micropores have diameters between about 0.4 and 2 nm; and mesopores have a diameter between 2 and 50 nm. For example, activated carbon is a form of carbon processed so as so be riddled with small pores that increase the surface area available for adsorption or chemical reactions. Activated carbon comprises a class of porous graphitic carbon that can be treated by the process of this disclosure to provide novel, useful materials. Examples of suitable forms of activated carbon include powder, granulated, extruded, fiber or bead. Graphitic carbon can be activated or modified with such agents as nitric acid, phosphoric acid, hydrogen peroxide, steam, air, carbon dioxide, potassium hydroxide or sulfuric acid prior to the treatment described in this disclosure.

Graphitic carbon, particularly activated carbons treated by the process of the present disclosure can, in some embodiments, be used as filter media in applications such as purification of gases such as air, liquids such as water, purification of metal plating solutions or treatment of sewage. For example, activated carbon treated by an exemplary process of the present disclosure so as to incorporate basic amino groups can be used to adsorb acidic gases such as hydrogen chloride from respirable air. In another exemplary embodiment, activated carbon materials produced by an exemplary process of the present disclosure so as to incorporate sulfur-containing groups can be used as adsorbents for heavy metals such as lead or mercury. In some exemplary embodiments, the treated activated graphitic carbon can be combined with impregnates such as alumina, silver nanoparticles or salts of metals such as copper, molybdenum or zinc. Activated graphitic carbon produced by an exemplary process of the present disclosure may also be used to support catalytically active metals such as platinum, palladium, rhodium or ruthenium. In some exemplary embodiments, a group of activated graphitic carbons can be formed into a larger article by combining them with a non-graphitic binder such as polyethylene.

The illustrative chemical reactions related above generally lead to attachment of small molecules, i.e. molecules containing fewer than 100 atoms, to the surface of graphitic carbon. However, in other embodiments, connection of much larger moieties is also possible. This can be achieved by attaching polymer chains to these surfaces. By polymer is meant a chain of repeated subunits or monomers composing at least two and up to 1000 monomers, same or different. Because exemplary processes of the present disclosure add functional groups to the surfaces of graphitic carbon, the need for additional functionalization, e.g. by oxidation with nitric acid as is often done in the prior art, may be advantageously bypassed.

In some exemplary embodiments, attaching polymer chains to graphitic carbon is accomplished by bonding preformed polymer chains of known length to the surface. For example, a graphitic carbon prepared according to the process of the present disclosure and that contains hydroxyl groups can be combined with a reactive polyolefin such as Epolene™ E43. This material comprises modified polypropylene chains containing approximately 90 monomer units to which pendant maleic anhydride moieties have been grafted. In some embodiments, the anhydride groups react with the hydroxyl groups to form ester linkages that covalently bond the modified polypropylene chains to the graphitic carbon.

In other exemplary embodiments, suitable reactive groups such as hydroxyl or carboxylic acid, added to the surface of graphitic carbon by exemplary processes of the present disclosure, are used to initiate the growth of polymer chains so as to create a polymer brush. A polymer brush is a layer of polymer chains attached at one end to the surface of an object and so named because of their fanciful similarity to bristles in a common brush. This can be done in many ways as illustrated below. The illustrations are meant to be only illustrative of exemplary embodiments and not limiting or exhaustive.

In one exemplary embodiment, a method of growing such a polymer brush starts by reacting graphitic carbon functionalized by the process disclosed herein with 2-bromoisobutyryl bromide. Elimination of hydrogen bromide leads to formation of surface 2-bromoisobutyryl groups. Subsequent copper-mediated surface-initiated controlled radical polymerization with acrylate esters such as t-butyl acrylate can result in growth of hydrophobic poly(t-butylacrylate) chains emanating from the surface of the graphitic carbon. Hydrolysis of the ester groups in the polymer chain can transform them into carboxylic acid groups in hydrophilic poly(acrylic acid) chains. For creation of polymer chains on graphitic carbon, in some embodiments, suitable monomers include, without limitation, acrylic acid esters and methylacrylic acid esters such as methyl acrylate, 2-hydroxyethyl acrylate, 2-ethylhexyl acrylate, poly(ethyleneglycol) acrylate, diethylaminoethyl methacrylate, heptafluorodecyl methacrylate and glycidyl methacrylate. Methacrylamides and acrylamides such as N-isopropylacrylamide can be similarly polymerized.

In another exemplary embodiment, growth of a polymer brush on graphitic carbon can be achieved through reacting hydroxyl groups-incorporated by the process of the present disclosure along wish a tin bis(ethylhexanoate) catalyst to initiate ring-opening polymerization of caprolactone to generate poly($\epsilon$-caprolactone) chains containing up to 600 monomer units or more.

The number of monomer repeated units in a polymer so attached to a graphitic carbon can be ascertained by chemically cleaving the chains and then analyzing them by size exclusion chromatography. Because not all the chains are of the same length, the analysis yields a distribution of chain lengths along with the maximum and minimum chain lengths.

In some exemplary embodiments, attachment of polymer chains to graphitic carbon according to the methods of the present disclosure may confer new and useful properties on the graphitic carbon. In one embodiment, short polymer chains act as physical spacers that inhibit close approach of the carbons to one another and thus prevent their aggregation. In one embodiment, polymers bearing hydrophobic and hydrophilic groups improve dispersibility in nonpolar liquids and water respectively. In one embodiment, polymer chains containing at least 50 and preferably at least 150 repeat units attached to a graphitic carbon can interact and entangle with chains in a matrix comprised of the same polymer. This compatibility may allow the graphitic carbon to act as a reinforcing agent in a composite.

Exemplary compounds that may be attached to graphitic carbons include difunctional diamines such as ethylenediamine, aminosilanes such as aminopropyltrimethoxysilane, allyl amines such as allyl amine -vinylic amine, acetylenic amines such as propargyl amine, nitrile-functionalized amines such as imino bis(propionitrile), long chain amines such as octyl amine, combinations of amines and alcohols such as ethanolamine, sulfonic acid derivatives such as p-toluene sulfonic acid, amino acids such as tryptophan, cyanide compounds such as potassium cyanide, hydroxide salts such as sodium hydroxide, potassium hydroxide, and ammonium hydroxide, sodium sulfide, and thiocyanate.

Without wishing to be held to any particular theory, it is believed that the functional group is transferred to the product with the amine group. Without wishing to be held to the theory, it is further believed that the oxygen is present as —COOH groups, nitrogen is present as NH or nitrogen substitution of carbon, such as in pyrimidine, and sulfur is present as substitution of carbon.

EXAMPLES

X-ray photoelectron spectra (XPS) for each of the following were collected on a Phi Versa Probe II instrument using Al K$\alpha$ radiation. The samples were lightly pressed into pellets for analysis. Compositions are reported as the average of at least two areas on the pellet surface and are expressed in atom percent.

Reaction of CF and Ammonia. 0.175 grams of graphite fluoride ("CF"), was placed in an alumina combustion boat and this into a silica tube surrounded by a furnace. The tube was purged with argon for 15 minutes and anhydrous ammonia for 15 minutes. The tube was then heated to 300°

C. at 15° C./min. After 1 hr. at this temperature, heating was discontinued and the reactor was allowed to cool. The black product in the boat weighed 0.135 grams. XPS analysis determined that the composition of the product was: C, 49.6%; F, 47.8%; N, 2.1%; O, 0.5%. When the reaction temperature was increased to 400° C., the composition of the product was C, 83.0%; F, 0.9%; N, 13.6%; O, 3.4%.

Reaction of CH and $H_2N(CH_2)_3Si(OCH_3)_3$. 0.2 grams of CF, and 2 mL aminopropyltrimethoxysilane were placed in a capped polypropylene tube. The contents were heated and stirred at 88° C. for 16 hours. After cooling to room temperature, the reaction mixture was diluted with an equal volume of methanol then filtered. The solids were washed with methanol than hexane and vacuum dried. The yield was 0.39 grams, XPS analysis determined that the composition of the product was: C, 45.2%; F, 14.0%; N, 10.9%; O, 18.5%: Si, 11.5%.

Reaction of CF and Tetra-n-butylammonium cyanide. A mixture of 0.2 grams CF, 0.75 gm $[Bu_4N][CN]$, a tiny crystal of $C_8F_{17}SO_3H$ and 2 mL dimethyl sulfoxide was heated and stirred at 88° C. for 3 hours. The reaction mixture was filtered and the solid product, after washing with methanol, hexane and vacuum drying, weighed 0.15 grams. XPS analysis determined that the composition of the product was: C, 71.0%; F, 17.2%; N, 8.7%; O, 1.8%.

Reaction of CF and $HS(CH_2)_3Si(OCH_3)_3$. A mixture of 0.2 grams CF, 3 mL methanol, 1.0 mL mercaptopropyltrimethoxysilane and a tiny crystal of 1,4-diazabicycl[2.2.2]octane (dabco) was stirred at room temperature for 16 hours. The reaction mixture was filtered and, after washing with methanol, hexane and vacuum drying, weighed 0.19 grams. XPS analysis determined that the composition of the product was: C, 52.6%; F, 45.4%, S, 0.5%, Si, 0.7%.

Reaction of CF and Ethylenediamine. A 0.2 gram sample of CF was placed in a small polypropylene vial. This was placed, along with ethylenediamine, in a larger, capped container so that the graphite fluoride was exposed to only the vapor of the diamine. After 48 hr., the product was removed and subjected to dynamic pumping in order to remove any loosely adsorbed diamine. The yield 0.23 grams. XPS analysis determined that the composition of the product was: C, 50.2%; F, 43.4%; N, 3.0%; O, 3.4%. Strong (s) and weak (w) infrared absorption peaks were observed at: 1663 (w), 1200 (s), 1109 (s), 876 (w).

Reaction of CF and Allylamine. A 0.3 gram quantity of CF and 3 mL allylamine were combined in a capped polypropylene tube and heated to 80° C. and stirred for 24 hr. The product was isolated by filtration, washed with methanol and air dried. It weighed 0.17 gram. XPS analysis determined that the composition of the product was C, 70.1%; F, 18.4%, N, 8.5%; O, 3.0%.

Reaction of CF and Imino bis(propionitrile) CF, 0.2 gram and 2 mL imino bis(propionitrile) were heated to 105° C. and stirred for 24 hr. in a capped polypropylene tube. The product, isolated by filtration and washed with methanol, weighed 0.17 gram. XPS analysis determined that the composition was C, 55.3%; F, 38.6%; N, 3.4%; O, 2.7%.

Reaction of CF and Propargylamine. A 0.2 gram quantity of CF, 3 mL dimethyl sulfoxide and 0.24 gram propargylamine were stirred at room temperature for 20 hr. The product, isolated by filtration and washed with methanol, weighed 0.18 gram. XPS analysis determined that the composition of the product was C, 55.3%; F, 38.6%; N, 3.4%; O, 2.7%.

Reaction of CF and 1-Octylamine. A 0.2 gram quantity of CF and 2 mL 1-octylamine were heated to 85° C. and stirred for 20 hr. The product, isolated by filtration and washed with methanol, weighed 0.18 gram. XPS analysis determined that the composition was C, 79.7%; F, 12.9%; N, 6.1%; O, 1.3%.

Reaction of CF and Ethanolamine. A 0.2 gram quantity of CF and 3 mL ethanolamine were heated and stirred at 85° C. for 18 hr. The product, isolated by filtration and washed with methanol, weighed 0.13 gram. XPS analysis determined that the composition was C, 77.9%; F, 3.4%; N, 10.8%; O, 7.9%.

Reaction of CF and N,N-Dimethylethylene diamine. A 0.2 gm quantity of CF and 3 mL N,N-dimethylethylene diamine was heated and stirred at 90° C. for 2 hr. The gelatinous reaction mixture was diluted with an equal volume of methanol then filtered. After further washing with methanol and air drying, the product weighed 0.14 gram. XPS analysis determined that the composition was C, 79.0%; F, 3.2%; N, 14.4%; O, 3.4%:

Mechanochemical Reaction of CF with p-Tolyenesulfonic acid Monohydrate. The reaction was carried out in a cylindrical stainless steel reactor 30 mm in length and an i.d of 11 mm. It contained two 0.97 gram and one 0.24 gram steel balls. Agitation was provided by a Wig L Bug amalgamator manufactured by Crescent Dental Supply Co. using a 50% duty cycle, i.e., 30 sec. on and 30 sec. off. A 0.16 gram quantity of CF and 0.11 gram p-toluenesulfonic acid monohydrate was milled for a total of 6 min. The product was washed from the reactor with methanol and air dried. It weighed 0.14 gram. XS analysis determined that the composition of the product was C, 54.4%; F, 37.3%; S, 1.9%; O, 6.9%; N, 0.5%. The nitrogen is present as an impurity in the starting CF.

Mechanochemical Reaction of CF with Tryptophan. A 0.15 gram quantity of CF and 0.09 gram d/l-tryptophan were ball milled as described above. The product weighed 0.16 gram. XPS analysis determined that the composition of the product was C, 56.8%; F, 39.7%; N, 3.0%, O, 2.3%.

Mechanochemical Reaction of CF with Potassium Cyanide. A 0.25 gram quantity of CF and 0.09 gram potassium cyanide were ball milled as described above. The product after washing with water and methanol weighed 0.14 gram. XPS analysis determined that the composition of the product was C, 52.4%; F, 44.5%; N, 1.7%; O, 1.4%.

Hydrothermal Reaction of CF with Sodium Hydroxide. Hydrothermal reactions were carried out at 200° C. in an unstirred Teflon-lined stainless steel vessel of 20 mL capacity. A 0.15 gram quantity of CF, 0.02 gram $C_8F_{17}SO_3K$ and 7 mL 0.5M sodium hydroxide in water were heated at 200° C. for 20 hr. The product was isolated by filtration and washed with four 5 mL portions of hot (80° C.) water then with methanol. It weighed 0.07 gram. XPS analysis determined that the composition was C, 57.0%; F, 36.1%; O, 5.8%; N, 0.8%.

A similar reaction was carried out but instead using 0.4 grams CF and 10.0M sodium hydroxide. The black product was mixed with 20 mL 0.2M hydrochloric acid resulting in an inky black suspension and demonstrating dispersibility in water. The suspension was passed through a medium porosity glass frit to allow isolation of the solid. This was than washed with 400 mL water then 10 ml, methanol then 1 mL hexane. After air drying, it weighed 0.15 gram. XPS analysis determined that the composition was C, 78.8%; F, 2.3%; O, 17.7%; N, 1.2%.

Hydrothermal Reaction of CF with Ammonium Hydroxide. A mixture of 0.15 gram CF, 0.02 gram $C_8F_{17}SO_3K$ and 5 mL concentrated ammonium hydroxide was heated for 20 hr at 200° C. as described above. The solid product was washed with water until the pH of the runoff was about 7, then washed with methanol. After air drying, it weighed 0.085 gram. XPS analysis determined that the composition was C, 79.4%; F, 0.9%; N, 14.9%; O, 4.8%.

Hydrothermal Reaction of CF with Potassium Cyanide. A mixture of 0.15 gram CF, 0.02 gram $C_8F_{17}SO_3K$, 0.46 gram potassium cyanide and 5 mL water was heated for 20 hr at 200° C. The solid product was washed with water until the pH of the runoff was about 7, then with methanol. After air drying, it weighed 0.07 gram. XPS analysis determined that the composition was C, 79.4%; F, 3.7%; N, 10.7%; O, 6.2%.

Reaction of CF with Potassium Hydroxide. A 0.17 grain quantity of CF, three potassium hydroxide pellets (freshly ground to a powder with a mortar and pestle) and 3 mL t-butanol were combined in a polypropylene tube. The mixture was heated and stirred at 80° C. for 36 hr. The product was washed successively with methanol, water and methanol. After air drying, it weighed 0.12 gram. XPS analysis determined that the composition was C, 59.6%; F, 32.1%; O, 6.4%; N, 0.6%; K, 1.2%.

Hydrothermal Reaction of CF with Sodium Sulfide. A 0.2 gram quantity of CF, 0.03 gram $C_8F_{17}SO_3K$, 1.95 gram sodium sulfide and 5 mL water were heated, at 200° C. for 20 hr. The product was isolated by filtration and washed successively with methanol, ater and hexane. After air drying, it weighed 0.18 gram. XPS analysis determined that the composition was C, 74.3%; F, 6.6%; O, 9.5%; S, 2.0%; Na, 6.0%.

Reaction of CF with Sodium Sulfide in Dimethyl Sulfoxide. A 0.24 gram quantity of CF, 0.5 gram sodium sulfide and 5 mL dimethyl sulfoxide were heated in a polypropylene tube to 107° C. for 20 hr. Filtration gave a crude product that was washed with fresh solvent then methanol. This was dispersed in a mixture of 20 mL methanol and 1 mL 1M hydrochloric acid. Passage of the dispersion through a medium porosity glass frit allowed isolation of the product. It was washed successively with 60 mL water, 20 mL methanol and 5 mL hexane. After air drying, it weighed 0.13 gram. XPS analysis indicated that the composition was C, 78.1%; F, 3.7%; O, 10.4%; S, 4.7%; N, 0.9%; Na, 2.2%.

Hydrothermal Reaction of CF with Sodium Thiocyanate. A 0.4 gram quantity of CF, 0.04 gram $C_8F_{17}SO_3K$, 1.85 gram sodium thiocyanate and 5 mL water were heated at 200° C. for 22 hr. The product was isolated by filtration and washed successively with hot (90° C.) water, 40 mL of a 1:1 (v/v) mixture of methanol and 0.2M hydrochloric acid, 40 mL water, 40 mL methanol and 2 mL hexane. It was then extracted with benzene to remove any elemental sulfur present. After air drying, it weighed 0.2 gram. XPS analysis indicated that the composition was C, 86.5%; O, 4.2%; S, 5.3%; N, 4.0%.

Other embodiments of this invention will be apparent to those skilled in the art upon consideration of this specification or from practices of the invention disclosed herein. Various omissions, modifications and changes to the principles and embodiments described herein may be made by one skilled in the art without departing fern the true scope and spirit of the invention which is included in the following claims.

What is claimed is:

1. A process for modifying graphitic carbon, comprising:
reacting a fluorinating agent with at least part of the graphitic carbon; and
reacting the fluorinated graphitic carbon with at least one compound comprising at least one element selected from the group consisting of: phosphorus, tin, gallium, and indium to replace at least part of the fluorine atoms bonded to the graphitic carbon;
wherein the at least one element is bonded to at least one hydrogen atom.

2. A process as in claim 1, further comprising the step of removing the at least part of any remaining fluorine atoms bonded to said graphitic carbon.

3. A process as in claim 1, wherein reacting the fluorinated graphitic carbon with at least one compound further comprises addition of a surfactant.

4. A process as in claim 1, wherein said graphitic carbon comprises a layer having a thickness within the range of 1.6 nm to 10 mm.

5. A process as in claim 1, wherein said graphitic carbon comprises at least one of graphite, carbon black, a carbon fiber, activated carbon, and exfoliated graphite.

6. A process for modifying graphitic carbon, comprising:
reacting a fluorinating agent with at least part of the graphitic carbon; and
reacting the fluorinated graphitic carbon with at least one compound comprising at least one element selected from the group consisting of: indium, germanium, arsenic, gallium, phosphorus, tin, and ytterbium to replace at least part of the fluorine atoms bonded to the graphitic carbon;
wherein the at least one element is bonded to at least one element selected from the group consisting of: chlorine, bromine, and iodine.

7. A process for modifying graphitic carbon, comprising:
reacting a fluorinating agent with at least part of the graphitic carbon; and
reacting the fluorinated graphitic carbon with at least one compound comprising at least one element selected from the group consisting of: magnesium, gallium, indium, tin, lead, manganese, and samarium to replace at least part of the fluorine atoms bonded to the graphitic carbon;
wherein the at least one element is bonded to at least one carbon atom.

8. A process for modifying graphitic carbon, comprising:
reacting a fluorinating agent with at least part of the graphitic carbon; and
reacting the fluorinated graphitic carbon with at least one compound comprising at least one functional group selected from the group consisting of: amino, azido, cyano, cyanate, isocyanato, thiocyanato, mercapto, hydrocarbylmercapto, substituted hydrocarbylmercapto, and perfluorohydrocarbyl, the functional groups being bonded to at least one element selected from the group consisting of silicon, tin, phosphorous, boron, aluminum, and indium;
wherein the at least one compound comprises at least one element selected from the group consisting of: iodine, phosphorus, germanium, tin, iron, cobalt, gallium, ytterbium, magnesium, indium, lead, arsenic, manganese, samarium, and nickel.

9. A process for modifying graphitic carbon, comprising:
reacting a fluorinating agent with at least part of the graphitic carbon; and
reacting the fluorinated graphitic carbon with at least one compound comprising hydrocarbyl groups or hydrocarbyl groups substituted with at least one element selected from the group consisting of: oxygen, nitrogen, sulfur, silicon, phosphorus, boron, chlorine, fluorine, and iodine, the compounds being bonded to at least one element selected from the group consisting of: magnesium, boron, aluminum, indium, zinc, copper, tin, manganese, and samarium;

wherein the at least one compound comprises at least one element selected from the group consisting of: iodine, phosphorous, germanium, tin, iron, cobalt, gallium, ytterbium, magnesium, indium, lead, arsenic, manganese, samarium, and nickel.

10. A process for modifying graphitic carbon comprising:
reacting a fluorinating agent with at least part of the graphitic carbon; and
reacting the fluorinated graphitic carbon with hydrogen to replace at least part of the fluorine atoms bonded to the graphitic carbon with hydrogen, the hydrogen being supplied by a hydrogen-containing plasma.

11. A process for modifying graphitic carbon, comprising:
reacting a fluorinating agent with at least part of the graphitic carbon; and
reacting the fluorinated graphitic carbon with at least one compound comprising at least one element selected from the group consisting of: hydrogen, boron, nitrogen, oxygen, chlorine, bromine, iodine, sulfur, phosphorous, silicon, germanium, tin, aluminum, iron, cobalt, gallium, ytterbium, magnesium, calcium, indium, zinc, lead, copper, arsenic, manganese, samarium, and nickel to replace at least part of the fluorine atoms bonded to the graphitic carbon;
wherein the at least one compound comprises at least one functional group selected from the group consisting of amino, azido, cyano, cyanate, isocyanato, thiocyanato, mercapto, hydrocarbylmercapto, substituted hydrocarbyl mercapto, and perfluorohydrocarbyl, the functional groups being bonded to at least one element selected from the group consisting of: silicon, tin, phosphorous, boron, aluminum, and indium.

12. A process for modifying graphitic carbon, comprising:
reacting a fluorinating agent with at least part of the graphitic carbon; and
reacting the fluorinated graphitic carbon with at least one compound comprising at least one element selected from the group consisting of: magnesium, calcium, boron, aluminum, gallium, indium, zinc, silicon, tin, lead, copper, manganese, and samarium to replace at least part of the fluorine atoms bonded to the graphitic carbon, wherein the at least one element is bonded to at least one carbon atom.

13. A process for modifying graphitic carbon, comprising:
reacting a fluorinating agent with at least part of the graphitic carbon; and
reacting the fluorinated graphitic carbon with at least one compound comprising at least one element selected from the group consisting of: hydrogen, boron, nitrogen, oxygen, chlorine, bromine, iodine, sulfur, phosphorus, silicon, germanium, tin, aluminum, iron, cobalt, gallium, ytterbium, magnesium, calcium, indium, zinc, lead, copper, arsenic, manganese, samarium, and nickel to replace at least part of the fluorine atoms bonded to the graphitic carbon with the at least one element;
wherein when the at least one compound comprises nitrogen, the compound contains no more than one primary amine group;
wherein the process occurs at a temperature of 400° C. or lower; and
wherein said compounds comprise hydrocarbyl groups or hydrocarbyl groups substituted with at least one element selected from the group consisting of oxygen, nitrogen, sulfur, silicon, phosphorus, boron, chlorine, fluorine, bromine, and iodine, the compounds being bonded to at least one element selected from the group consisting of: magnesium, boron, aluminum, indium, zinc, copper, tin, manganese, and samarium.

14. A process for modifying graphitic carbon, comprising:
reacting a fluorinating agent with at least part of the graphitic carbon; and
reacting the fluorinated graphitic carbon with at least one compound comprising at least one element selected from the group consisting of: iodine, phosphorus, germanium, tin, iron, cobalt, gallium, ytterbium, magnesium, indium, lead, arsenic, manganese, samarium, and nickel to replace at least part of the fluorine atoms bonded to the graphitic carbon; and
removing the at least part of any remaining fluorine atoms bonded to said graphitic carbon.

* * * * *